US011872624B2

(12) United States Patent
Watanabe et al.

(10) Patent No.: US 11,872,624 B2
(45) **Date of Patent: *Jan. 16, 2024**

(54) COPPER ALLOY POWDER HAVING SI COATING FILM AND METHOD FOR PRODUCING SAME

(71) Applicant: JX Nippon Mining & Metals Corporation, Tokyo (JP)

(72) Inventors: Hirofumi Watanabe, Ibaraki (JP); Yoshitaka Shibuya, Ibaraki (JP)

(73) Assignee: JX METALS CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/771,552

(22) PCT Filed: Jun. 25, 2021

(86) PCT No.: PCT/JP2021/024219

§ 371 (c)(1),
(2) Date: Apr. 25, 2022

(87) PCT Pub. No.: WO2021/261591

PCT Pub. Date: Dec. 30, 2021

(65) Prior Publication Data

US 2022/0362844 A1 Nov. 17, 2022

(30) Foreign Application Priority Data

Jun. 26, 2020 (JP) ................................ 2020-110405

(51) Int. Cl.
*B22F 1/16* (2022.01)
*B22F 1/05* (2022.01)

(52) U.S. Cl.
CPC .................. *B22F 1/16* (2022.01); *B22F 1/05* (2022.01); *B22F 2301/10* (2013.01); *B22F 2304/10* (2013.01); *Y10T 428/12181* (2015.01)

(58) Field of Classification Search
None
See application file for complete search history.

(56) References Cited

U.S. PATENT DOCUMENTS 4,049,426 A * 9/1977 Watson .................... C22F 1/08 148/411
7,393,586 B2 * 7/2008 Okada ...................... B22F 1/16 428/404
11,498,122 B2 * 11/2022 Watanabe .............. B22F 1/102
2014/0026776 A1 * 1/2014 Kecskes ................... C22C 1/11 102/305
2014/0079584 A1 3/2014 Simon et al.
2016/0230026 A1 8/2016 Furusawa
2019/0275587 A1 9/2019 Matsuoka et al.
2020/0188995 A1 6/2020 Shibuya et al.
2021/0039192 A1 2/2021 Watanabe et al.
2021/0053114 A1 2/2021 Watanabe et al.
2021/0178465 A1 6/2021 Endo et al.

FOREIGN PATENT DOCUMENTS

| | | | |
|---|---|---|---|
| CN | 109794602 | A | 5/2019 |
| JP | 2006-028565 | A | 2/2006 |
| JP | 2017-025392 | A | 2/2017 |
| JP | 2018-178239 | A | 11/2018 |
| JP | 2019-044260 | A | 3/2019 |
| JP | 2019-173058 | A | 10/2019 |
| WO | 2019/044073 | A1 | 3/2019 |
| WO | 2019/064745 | A1 | 4/2019 |
| WO | 2019/239655 | A1 | 12/2019 |
| WO | 2020/138273 | A1 | 7/2020 |
| WO | 2020/138274 | A1 | 7/2020 |

OTHER PUBLICATIONS

International Search Report and Written Opinion of the International Searching Authority dated Aug. 24, 2021 for International PCT Patent Application No. PCT/JP2021/024219.
European Search Report issued in corresponding EP Patent Application No. 21827563.4 dated Oct. 13, 2023.

* cited by examiner

*Primary Examiner* — Seth Dumbris
(74) *Attorney, Agent, or Firm* — Howson & Howson LLP

(57) ABSTRACT

Provided is a copper alloy powder which is a metal powder to be used for additive manufacturing by a laser beam system, and which is able to achieve a higher laser absorption rate and additionally suppress heat transfer through necking, and a method for producing this copper alloy powder. A copper alloy powder which contains one or more elements selected from among Cr, Zr and Nb in a total amount of 15 wt % or less, with a balance being made up of Cu and unavoidable impurities, and which is characterized in that a coating film containing Si atoms is formed on the copper alloy powder, and a Si concentration in the copper alloy powder with the coating film is 5 wt ppm or more and 700 wt ppm or less.

20 Claims, No Drawings

COPPER ALLOY POWDER HAVING SI COATING FILM AND METHOD FOR PRODUCING SAME

TECHNICAL FIELD

The present invention relates to a copper alloy powder having a Si coating film and a method for producing such copper alloy powder.

BACKGROUND ART

In recent years, attempts are being made for using 3D printer technology and producing three-dimensional metal components having a complex shape and deemed difficult to manufacture. 3D printing is also referred to as additive manufacturing (AM), and, as one method thereof, there is a method of producing a complex-shape metal manufactured object by thinly spreading a metal powder on a substrate to form a metal powder layer, melting the metal powder layer by selectively scanning the metal powder layer with a laser beam or an electron beam based on two-dimensional data and subsequently solidifying the metal powder layer, thinly spreading a new powder thereon and similarly melting a predetermined part by scanning it with a laser beam or an electron beam and subsequently solidifying the predetermined part, and repeating these processes.

Attempts are being made for using a pure copper powder or a copper alloy powder, which has superior conductivity and heat transfer rate, in manufacturing an additive manufactured object. Here, additive manufacturing is performed by the pure copper powder or the copper alloy powder being irradiated with a laser beam, but since the pure copper powder and the copper alloy powder have a low laser absorption rate and a high heat transfer rate, the heat loss is significant, and there is a problem in that the pure copper powder and the copper alloy powder cannot be sufficiently melted with a normal laser output, and additive manufacturing is difficult. Furthermore, while it may be possible to irradiate the pure copper powder or the copper alloy powder with a high power laser for a long period in order to melt the pure copper powder or the copper alloy powder, in such a case there is a problem in that the load of the laser is great and the productivity is inferior.

Patent Document 1 discloses a technology of providing an oxide coating film by heating a copper atomized powder in an oxidation atmosphere in order to increase the laser absorption. While Patent Document 1 is a superior technology capable of increasing the laser absorption rate with the oxide coating film, on the other hand there are cases where a slag (copper oxide) is formed during the manufacturing process and remains without melting, which in turn ultimately generates voids (pores) in the additive manufactured object, and deteriorates the density. Furthermore, since the laser absorption rate changes depending on the level of oxidation, it is necessary to change the laser conditions and the like on a case-by-case basis.

Moreover, Patent Document 2 describes a technology of facilitating the additive manufacturing process by using, as the additive manufacturing powder, a copper alloy powder obtained by adding a predetermined amount of chromium (Cr) to copper (Cu), and thereby lowering the heat transfer rate in comparison to a case of using pure copper. By adding an alloy element to copper as described above, while additive manufacturing is facilitated in comparison to the case of performing additive manufacturing using pure copper, there is a problem in that it is not possible to achieve sufficient density and conductivity for use as a copper alloy product.

PRIOR ART DOCUMENTS

Patent Documents

[Patent Document 1] Japanese Unexamined Patent Application Publication No. 2018-178239

[Patent Document 2] Japanese Unexamined Patent Application Publication No. 2019-44260

DISCLOSURE OF THE INVENTION

Problems to be Solved by the Invention

An object of the present invention is to provide a copper alloy powder to be used for additive manufacturing by a laser beam system, and which is able to achieve a higher laser absorption rate and additionally suppress heat transfer through necking, and a method for producing this copper alloy powder.

Means for Solving the Problems

As one mode of the present invention, provided is a copper alloy powder which contains one or more elements selected from among Cr, Zr and Nb in a total amount of 15 wt % or less, with a balance being made up of Cu and unavoidable impurities, and which is characterized in that a coating film containing Si atoms is formed on the copper alloy powder, and a Si concentration in the copper alloy powder with the coating film is 5 wt ppm or more and 700 wt ppm or less.

As another mode of the present invention, provided is a copper alloy powder which contains Cr in an amount of 15 wt % or less, with a balance being made up of Cu and unavoidable impurities, and which is characterized in that a coating film containing Si atoms is formed on the copper alloy powder, and a Si concentration in the copper alloy powder with the coating film is 5 wt ppm or more and 700 wt ppm or less.

As yet another mode of the present invention, provided is a copper alloy powder which contains Cr in an amount of 8 wt % or less and Nb in an amount of 7 wt % or less, with a balance being made up of Cu and unavoidable impurities, and which is characterized in that a coating film containing Si atoms is formed on the copper alloy powder, and a Si concentration in the copper alloy powder with the coating film is 5 wt ppm or more and 700 wt ppm or less.

As yet another mode of the present invention, provided is a copper alloy powder which contains Cr in an amount of 12 wt % or less and Zr in an amount of 3 wt % or less, with a balance being made up of Cu and unavoidable impurities, and which is characterized in that a coating film containing Si atoms is formed on the copper alloy powder, and a Si concentration in the copper alloy powder with the coating film is 5 wt ppm or more and 700 wt ppm or less.

Effect of the Invention

According to the present invention, in the additive manufacturing by a laser beam system, it is possible to further improve the laser absorption of the metal powder used in the additive manufacturing, and additionally suppress heat transfer through necking. Consequently, the production of a dense additive manufactured object (additive manufactured object having a high relative density) an be expected. Moreover, it becomes possible to sufficiently melt the metal powder even with a low-output laser beam, and the alleviation of the load on the laser can be expected.

BEST MODE FOR CARRYING OUT THE INVENTION

When manufacturing objects using a pure copper powder or a copper alloy powder in the additive manufacturing by a laser beam system, since copper has a low laser absorption rate and sufficient heat input is not possible, there was a problem in that the powder cannot be fully melted. Moreover, since copper has a high heat transfer rate, there was a possibility that the range of additive manufacturing cannot be fully melted. Such being the case, efforts were made for improving the laser absorption by performing oxidation treatment to pure copper (Patent Document 1) and reducing the heat transfer rate by adding a dissimilar metal to pure copper and alloying the pure copper (Patent Document 2).

In both of the foregoing efforts, while there was a certain level of effect in melting the metal powder with a laser beam, it could not be said that the improvement of the laser absorption rate was sufficient, and it was necessary to adjust the other conditions (conditions such as laser output and scanning speed) in order to produce a high-density additive manufactured object. As a result of intense study regarding this kind of problem, the present inventors discovered that the laser absorption rate can be increased by forming a coating film containing a predetermined amount of Si on the copper alloy powder, the formation of necking of the copper alloy powders can be suppressed, and heat loss (heat transfer) through necking can be restricted. In the additive manufacturing by a laser beam system, improvement of the laser absorption rate can be expected through efficient heat input. Moreover, the suppression of heat loss through necking will enable the efficient melting of the copper alloy powder, and the production of a high-density, high-definition additive manufactured object. Furthermore, since a high-density additive manufactured object can be obtained with a low laser output, reduction in the load of the laser can be expected.

While the following explanation describes in detail, to a certain extent, this embodiment in order to deepen the understanding of the present invention, it is obvious that the present invention may be amended or modified to a certain extent within the scope of the appended claims. Moreover, it goes without saying that this embodiment is not limited to the details described in this specification.

The copper alloy powder according to this embodiment is a copper alloy powder which contains one or more elements selected from among Cr, Zr and Nb in a total amount of 15 wt % or less, with a balance being made up of Cu and unavoidable impurities, and which is characterized in that a coating film containing Si atoms is formed on the copper alloy powder, and a Si concentration in the copper alloy powder with the coating film is 5 wt ppm or more and 700 wt ppm or less. When the total content of the alloy element is 15 wt % or less, it is possible to prevent the unnecessary deterioration in the conductivity.

Preferably, the following copper alloy powder can be used.

1) A copper alloy powder which contains Cr in an amount of 15 wt % or less, with a balance being made up of Cu and unavoidable impurities.

2) A copper alloy powder which contains Cr in an amount of 8 wt % or less and Nb in an amount of 7 wt % or less, with a balance being made up of Cu and unavoidable impurities.

3) A copper alloy powder which contains Cr in an amount of 12 wt % or less and Zr in an amount of 3 wt % or less, with a balance being made up of Cu and unavoidable impurities.

4) A copper alloy powder which contains Zr in an amount of 3 wt % or less, with a balance being made up of Cu and unavoidable impurities.

By alloying copper (Cu), improvement in the mechanical property can also be expected in comparison to an additive manufactured object produced from pure copper. Meanwhile, when the content of the alloy element is too great, coarse intermetallic compounds become deposited, and this may lead to the impairment of the mechanical property and conductivity of the additive manufactured object. A content of the alloy element that will not impair the mechanical property and conductivity of the additive manufactured object is 15 wt % or less of Cr, 7 wt % or less of Nb, and 3 wt % or less of Zr. Accordingly, by causing the content of each alloy element to fall within the foregoing numerical range, it is expected that the mechanical property and conductivity will not decrease considerably. Moreover, based on conventional knowledge, Ni, Si, W, and Mo are also anticipated as being alloy element candidates in which similar effects as those described above can be expected.

The copper alloy powder according to this embodiment is characterized in that a coating film containing Si atoms is formed thereon. The formation of a coating film containing Si atoms can be determined by confirming the existence of a coating film, which contains Si near the surface of the copper alloy powder and does not contain any metal elements, upon observing the cross section of the copper alloy powder with a STEM (Scanning Transmission Electron Microscope). As the STEM, JEM-2100F manufactured by JEOL Ltd. may be used.

The copper alloy powder according to this embodiment is a copper alloy powder in which a coating film containing Si atoms is formed thereon, and is characterized in that the Si concentration in the copper alloy powder with the coating film is 5 wt ppm or more and 700 wt ppm or less. By forming a coating film containing Si atoms of the foregoing concentration on the surface of the copper alloy powder, improvement in the laser absorption rate can be expected. When the Si concentration is less than 5 wt ppm, improvement in the laser absorption rate will be insufficient. Meanwhile, when the Si concentration exceeds 700 wt ppm, since it may induce a decrease in the conductivity and density of the manufactured object, the Si concentration is preferably set to 700 wt ppm or less.

In the copper alloy powder according to this embodiment with a coating film containing Si atoms formed thereon, Si preferably exists in the form of a compound, and more preferably exists as $SiO_2$. This is because, when Si exists as a sole element, Si may become diffused after the additive manufacturing process and deteriorate the conductivity. As a result of Si existing as a compound, preferably as a more stable $SiO_2$, it is expected that the deterioration in the conductivity can be minimized. As a method of analyzing the chemical-bonding state of Si existing on the powder surface, XPS (X-ray photoelectron spectroscopy) can be used.

When analyzing the Si (2p) spectrum of the copper alloy powder according to this embodiment based on XPS analysis, preferably a maximum peak intensity exists in a binding energy range of 101 to 105 eV. When Si exists alone, a maximum peak intensity is detected in a binding energy range of 98 to 100 eV, and when Si exists as a compound, a maximum peak intensity is detected in a binding energy range of 101 to 105 eV. In particular, when Si exists as $SiO_2$, a maximum peak intensity is detected at a binding energy of 103 eV.

In the copper alloy powder of this embodiment, the oxygen concentration is preferably 2000 wt ppm or less, and more preferably 1000 wt ppm or less. When the oxygen concentration is high, a slag (oxide) may remain during the additive manufacturing with a laser beam, and this may lead to the deterioration in the density of the ultimately obtained additive manufactured object. Moreover, as a result of the manufactured object containing oxygen, there is a possibility that it may induce the deterioration in the mechanical property. By reducing the oxygen concentration in the copper alloy powder, the formation of pores can be suppressed, and a high-density additive manufactured object can be obtained.

When the Cu LMM spectrum of the copper alloy powder according to this embodiment is analyzed based on XPS, preferably a maximum peak intensity exists in a binding energy range of 569 to 571 eV. When copper exists alone, a maximum peak intensity appears at a binding energy of 568 eV or less, and when copper exists as copper oxide (I) or copper oxide (II), a maximum peak intensity appears in a binding energy range of 569 to 571 eV. As a result of copper existing in the form of a copper oxide, since the laser absorption rate can be further improved and there is a possibility that the manufacturability can also be improved, copper on the copper alloy powder surface preferably exists in the form of copper oxide (I) or copper oxide (II).

In the copper alloy powder according to this embodiment, carbon preferably has a heat resistant structure, and more preferably has a graphite structure. As a result of containing carbon, the heat transfer rate of the powder can be lowered, and heat loss can be suppressed. Furthermore, as a result of carbon having a heat resistant structure, heat loss can be suppressed even during the additive manufacturing process. In particular, as a result of carbon having a graphite structure, the laser absorption rate can be improved, and there is a possibility that the manufacturability can also be improved. Nevertheless, organic matter without heat resistance is easily lost during the additive manufacturing process, and it may be difficult to suppress heat loss.

As a method of analyzing the state of existence of carbon, Raman spectroscopy can be used. Raman spectroscopy, similar to XPS described above, is able to confirm the bonding state of atoms on the surface, and in particular a more detailed analysis is possible regarding the bonding of carbon. When the copper alloy powder according to this embodiment is measured based on Raman spectroscopy, a maximum scattering intensity value in a Raman shift range of 1000 to 2000 $cm^{-1}$ is preferably confirmed in a Raman shift range of 1200 to 1850 $cm^{-1}$, more preferably in a Raman shift range of 1300 to 1700 $cm^{-1}$. As a result of the maximum scattering intensity appearing in a Raman shift range of 1300 to 1700 $cm^{-1}$, it is possible to determine that the carbon has a graphite structure.

In this embodiment, the copper alloy powder preferably has an average particle diameter $D_{50}$ (median diameter) of 10 μm or more and 150 μm or less. As a result of causing the average particle diameter $D_{50}$ to be 10 μm or more, it becomes difficult for the powder to float during the additive manufacturing process, and the powder can be handled more easily. Meanwhile, by causing the average particle diameter $D_{50}$ to be 150 μm or less, it becomes easier to produce a high-definition additive manufactured object. Note that, in the present specification, the term "average particle diameter $D_{50}$" means the average particle diameter at an integrated value of 50% in the particle size distribution measured based on image analysis.

An additive manufactured object produced using the copper alloy powder according to this embodiment can be expected to have superior physical properties such as high conductivity. Generally speaking, when the density of an additive manufactured object is low, since foreign matter enters the additive manufactured object, the conductivity and mechanical property will also deteriorate and cause the various physical properties to worsen, but when the copper alloy powder according to this embodiment is used, an additive manufactured object having a relative density of 95% or higher can be produced with a low output, and an additive manufactured object having superior physical properties can be produced.

The method of producing the copper alloy powder according to this embodiment is now explained.

Foremost, the required amount of copper alloy powders (Cu—Cr, Cu—Cr—Zr, Cu—Cr—Nb and the like) are prepared. A copper alloy powder having an average particle diameter $D_{50}$ (median diameter) of 10 to 150 μm is preferably used. The average particle diameter can be achieved by sieving the powders to obtain the target particle diameter. While the copper alloy powder can be produced via the atomization method, it may also be produced using other methods, and is not limited to the copper alloy powder produced with the method described in this embodiment.

Next, pretreatment of the copper alloy powder is performed as needed. Since a natural oxide film is normally formed on the copper alloy powder, there are cases where it is difficult to form the intended bond. Accordingly, it is possible to eliminate (pickle) the oxide film in advance as needed. As the method of removal, for example, the natural oxide film can be removed by immersing the copper alloy powder in a dilute sulfuric acid aqueous solution. After pickling, the pure copper powder may also be washed with pure water as needed. Note that this pretreatment is a treatment that is performed when a natural oxide film is formed on the copper alloy powder, and there is no need to perform this pretreatment to all copper alloy powders. After pickling, the pure copper powder may also be washed with pure water as needed.

Next, in order to form a coating film containing Si atoms on the surface of the copper alloy powder, the copper alloy powder is immersed in a solution containing a silane coupling agent. The solution temperature is preferably set to 5° C. to 80° C. When the solution temperature is less than 5° C., the coverage of Si will deteriorate. Moreover, since the concentration of Si that will become attached will increase as the immersion time becomes longer, it is preferable to adjust the immersion time according to the Si concentration. As the silane coupling agent, any commercially available silane coupling agent may be used; for instance, aminosilane, vinylsilane, epoxysilane, mercaptosilane, methacrylsilane, ureidosilane, alkylsilane, carboxy group-containing silane or the like may be used.

As the solution containing a silane coupling agent or the like, an aqueous solution of 0.1 to 30% obtained by diluting the foregoing solution with pure water may be used. Since the Si concentration will increase as the concentration of the solution is higher, it is preferable to adjust the concentration according to the intended Si concentration. Moreover, the foregoing surface treatment may be performed while agitating the solution as needed. After the immersion treatment, the copper alloy powder is heated in a vacuum or an atmosphere to create a coupling reaction, and thereafter dried to form a coating film containing Si atoms. While the drying temperature will differ depending on the coupling agent that is used, it may be set, for example, to 70° C. to 120° C.

Next, the copper alloy powder with a coating film containing Si atoms formed thereon can be subject to heat treatment so as to remove organic matter that decomposes at a relatively low temperature. If any organic matter that decomposes at a relatively low temperature is remaining in the powder, there is a possibility that the coating film will deform due to the heat transfer during the manufacturing process, and it may not be possible to use the powder repeatedly. The heat treatment temperature is desirably set to a relatively high heat treatment temperature when the amount of Si is great and desirably set to a low heat treatment temperature when the amount of Si is small, and, for example, the heat treatment temperature may be set to be 400° C. or higher and 1000° C. or less. When the heat treatment temperature is less than 400° C., it may not be possible to sufficiently remove organic matter. Meanwhile, when the heat treatment temperature exceeds 1000° C., the sintering will advance quickly and it may not be possible to maintain the state of the powder. Furthermore, the heating may be performed in a vacuum (roughly $10^{-3}$ Pa).

The heating time is preferably adjusted together with the temperature, and, for example, the heating time may be set to be less than 12 hours. By setting the heating time to be less than 12 hours, it is possible to remove organic matter that decomposes at a relatively low temperature, and leave the carbon compound capable of withstanding a high temperature. When the heating time is long, carbon will be lost excessively, and there is a possibility that the oxidation will advance during storage.

Based on the above, it is possible to obtain a copper alloy powder with a coating film containing Si atoms formed thereon, and obtain a copper alloy powder having the intended Si concentration and oxygen concentration.

The following methods may be used as the method of evaluating the copper alloy powder.

(Si Concentration)

Manufacturer: SII

Name of device: SPS3500DD

Method of analysis: ICP-OES (Inductively Coupled Plasma Optical Emission Spectrometry)

Amount of measured sample: 1 g

Number of measurements: Measurement was performed twice, and the average value thereof was used as the concentration.

(Oxygen Concentration)

Manufacturer: LECO

Name of device: ONH analyzer

Method of analysis: Non-dispersive infrared method

Amount of measured sample: 1 g

Number of measurements: Measurement was performed twice, and the average value thereof was used as the concentration.

(Bonding State of Si)

Whether Si exists alone or exists as a compound can be confirmed with XPS. It is determined that a compound of Si exists when a 2p spectrum of Si is confirmed based on XPS and a maximum peak intensity exists in a binding energy range of 101 to 105 eV.

(Bonding of Copper and Oxygen)

The existence of a copper oxide can be confirmed with XPS. It is determined that a copper oxide exists when an LMM spectrum of Cu is confirmed based on XPS and a maximum peak intensity exists in a binding energy range of 569 to 571 eV.

(Bonding of Carbon)

The existence of a graphite structure can be confirmed based on Raman spectroscopy. It is determined that a graphite structure exists when a maximum scattering intensity value exists in a Raman shift range of 1350 to 1650 $cm^{-1}$ based on Raman spectroscopy measurement.

(Laser Absorption Rate)

The laser absorption rate of the copper alloy powder was analyzed using the following device.

Manufacturer: Shimadzu Corporation

Name of device: Spectrophotometer (MPC-3100, powder holder was used)

Measured wavelength: 300-1500 mm

Slit width: 20 nm

Reference: $BaSO_4$

Measured physical property value: Reflectance $$\text{Absorption (\%)} = 1 - (\text{reflectance (\%)})$$

(Evaluation of Suppression of Thermal Diffusion: Necking Formation)

The suppression of thermal diffusion can be evaluated from the perspective of necking formation. With the powder in which necking (partial sintering) has advanced due to heating, since the powders will bond together and the size will increase, the powders cannot pass through a sieve of a predetermined size. Accordingly, it is possible to determine that the sintering suppression effect is yielded due to heating if the powders can pass through the sieve. In order to verify this effect, for example, 50 g of a copper alloy powder is placed in an alumina crucible having a diameter of φ50 mm, heated in an atmosphere having a degree of vacuum of $1\times10^{-3}$ Pa or less at 800° C. for 4 hours, whether the heated copper alloy powder passes through a sieve having a sieve mesh size of 150 μm is confirmed, and the powder that passed through the sieve having a weight of 95% or higher is determined as being favorable (○), and other powders are determined as being unfavorable (×).

EXAMPLE 1, COMPARATIVE EXAMPLE 1

As the metal powder, a CuCrNb powder produced via the atomization method was prepared. The average particle diameter ($D_{50}$) was 66 μm in Example 1, and was 68 μm in Comparative Example 1. Next, in Example 1, the CuCrNb powder was immersed in a diaminosilane coupling agent aqueous solution (5%) diluted with pure water for 60 minutes, and thereafter dried at 80° C. in the atmosphere. After drying, the CuCrNb powder was subject to heat treatment in a vacuum at 800° C. Meanwhile, in Comparative Example 1, the CuCrNb powder was not subject to the series of treatments described above including surface treatment.

As a result of performing various types of analysis regarding the CuCrNb powder obtained based on the foregoing treatments, while a Si coating film existed, a copper oxide was formed, and carbon having a graphite structure was confirmed in Example 1, these could not be confirmed in Comparative Example 1. Furthermore, while the laser absorption rate was 50% or higher and favorable results were obtained for "suppression of necking formation (suppression of thermal diffusion)" in Example 1, the laser absorption rate was low and favorable results were not obtained for "suppression of necking formation" in Comparative Example 1.

Next, an additive manufactured object was produced based on the laser deposition method using the CuCrNb powders of Example 1 and Comparative Example 1. While a high-density manufactured object was obtained in both cases, when the output during the additive manufacture was measured, it was possible to perform the additive manufacture of Example 1 with a lower output. Based on this fact, it is considered that the load on the laser when performing additive manufacture can be reduced by using the CuCrNb powder formed with the coating film based on the treatments described above. The foregoing results are summarized in Table 1.

TABLE 1

| | | Example 1 | Comparative Example 1 | Example 2 | Example 3 | Comparative Example 2 |
|---|---|---|---|---|---|---|
| Particle diameter | μm | 66 | 68 | 64 | 65 | 67 |
| Cr concentration | wt % | 3.1 | 3.2 | 0.64 | 0.9 | 1.1 |
| Zr concentration | wt % | 0 | 0 | 0.08 | 0.07 | 0.06 |
| Nb concentration | wt % | 2.5 | 2.5 | 0 | 0 | 0 |
| Cu concentration | wt % | 94.4 | 94.3 | 99.28 | 99.03 | 98.84 |
| Surface treatment agent | — | Diaminosilane | — | Diaminosiiane | Epoxysilane | — |
| Heat treatment temperature | ° C. | 800 | — | 800 | — | — |
| Si film thickness | nm | 17 | — | 15 | 10 | — |
| Si concentration | wt ppm | 370 | 270 | 58 | 180 | <50 |
| O concentration | wt ppm | 300 | 300 | 160 | 1400 | 60 |
| Si (2p) XPS peak position | eV | 103 | — | 102 | 102 | — |
| Cu (LMM) XPS peak position | eV | 570.7 | 568.8 | 570.4 | 570.1 | 568.8 |
| C Raman maximum scattering intensity position | $cm^{-1}$ | 1598 | — | 1620 | — | — |
| Laser absorption rate | % | 61 | 48 | 53 | 47 | 35 |
| Suppression of necking formation | — | ○ | x | ○ | ○ | x |
| Relative density of manufactured object | % | 98 | 99 | — | — | — |
| Maximum output of laser during manufacture | W | 650 | 900 | — | — | — |

EXAMPLES 2 AND 3, COMPARATIVE EXAMPLE 2

As the metal powder, a CuCrZr powder produced via the atomization method was prepared. The average particle diameter ($D_{50}$) was 64 μm in Example 2, was 65 μm in Example 3, and was 67 μm in Comparative Example 2. Next, in Example 2, the CuCrZr powder was immersed in a diaminosilane coupling agent aqueous solution (5%) diluted with pure water for 60 minutes, and thereafter dried at 80° C. in the atmosphere. After drying, the CuCrZr powder was subject to heat treatment in a vacuum at 800° C. In Example 3, the CuCrZr powder was immersed in an epoxysilane coupling agent aqueous solution (5%) diluted with pure water for 60 minutes, and thereafter dried at 80° C. in the atmosphere. Note that heat treatment was not performed in Example 3. Meanwhile, in Comparative Example 2, the CuCrZr powder was not subject to the series of treatments described above including surface treatment.

As a result of performing various types of analysis regarding the CuCrZr powder obtained based on the foregoing treatments, while a Si coating film existed and a copper oxide was formed in Examples 2 and 3 and carbon having a graphite structure was confirmed in Example 2, these could not be confirmed in Comparative Example 2. Furthermore, while the laser absorption rate was 50% or higher and favorable results were obtained for "suppression of necking formation (suppression of thermal diffusion)" in Examples 2 and 3, the laser absorption rate was low and favorable results were not obtained for "suppression of necking formation" in Comparative Example 2. As described above, since Examples 2 and 3 are able to obtain the same analysis results as Example 1, it is considered that a high-density manufactured object can also be produced with a low output, and the load on the laser when performing additive manufacture can be reduced also for Examples 2 and 3. The foregoing analysis results are summarized in Table 1.

INDUSTRIAL APPLICABILITY

According to the present invention, in the additive manufacturing by a laser beam system, it is possible to improve the laser absorption, and suppress the heat transfer by suppressing the necking formation. The present invention is thereby able to exhibit a superior effect of being able to improve the density of the additive manufactured object and reduce the load of the laser device. The copper alloy powder according to this embodiment is particularly useful as a copper alloy powder for use in a metal 3D printer.

The invention claimed is:

1. A copper alloy powder which contains one or more elements selected from among Cr, Zr and Nb in a total amount of 15 wt % or less, with a balance being made up of Cu and unavoidable impurities, and which is characterized in that a coating film containing Si atoms is formed on the copper alloy powder, a Si concentration in the copper alloy powder with the coating film is 5 wt ppm or more and 700 wt ppm or less, when a 2p spectrum of Si is analyzed based on XPS analysis in the copper alloy powder with the coating film, a maximum peak intensity exists in a binding energy range of 101 to 105 eV, and, when analysis is performed based on Raman analysis in the copper alloy powder with the coating film containing Si atoms, a maximum scattering intensity value in a Raman shift range of 1000 to 2000 $cm^{-1}$ exists in a range of 1200 to 1850 $cm^{-1}$.

2. A copper alloy powder which contains Cr in an amount of 15 wt % or less, with a balance being made up of Cu and unavoidable impurities, and which is characterized in that a coating film containing Si atoms is formed on the copper alloy powder, a Si concentration in the copper alloy powder with the coating film is 5 wt ppm or more and 700 wt ppm or less, when a 2p spectrum of Si is analyzed based on XPS analysis in the copper alloy powder with the coating film, a maximum peak intensity exists in a binding energy range of 101 to 105 eV, and, when analysis is performed based on Raman analysis in the copper alloy powder with the coating film containing Si atoms, a maximum scattering intensity value in a Raman shift range of 1000 to 2000 $cm^{-1}$ exists in a range of 1200 to 1850 $cm^{-1}$.

3. A copper alloy powder which contains Cr in an amount of 12 wt % or less and Zr in an amount of 3 wt % or less, with a balance being made up of Cu and unavoidable impurities, and which is characterized in that a coating film containing Si atoms is formed on the copper alloy powder, a Si concentration in the copper alloy powder with the coating film is 5 wt ppm or more and 700 wt ppm or less, when a 2p spectrum of Si is analyzed based on XPS analysis in the copper alloy powder with the coating film, a maximum peak intensity exists in a binding energy range of 101 to 105 eV, and, when analysis is performed based on Raman analysis in the copper alloy powder with the coating film containing Si atoms, a maximum scattering intensity value in a Raman shift range of 1000 to 2000 $cm^{-1}$ exists in a range of 1200 to 1850 $cm^{-1}$.

4. A copper alloy powder which contains Cr in an amount of 8 wt % or less and Nb in an amount of 7 wt % or less, with a balance being made up of Cu and unavoidable impurities, and which is characterized in that a coating film containing Si atoms is formed on the copper alloy powder, a Si concentration in the copper alloy powder with the coating film is 5 wt ppm or more and 700 wt ppm or less, when a 2p spectrum of Si is analyzed based on XPS analysis in the copper alloy powder with the coating film, a maximum peak intensity exists in a binding energy range of 101 to 105 eV, and, when analysis is performed based on Raman analysis in the copper alloy powder with the coating film containing Si atoms, a maximum scattering intensity value in a Raman shift range of 1000 to 2000 $cm^{-1}$ exists in a range of 1200 to 1850 $cm^{-1}$.

5. The copper alloy powder according to claim 4, wherein an oxygen concentration in the copper alloy powder with the coating film containing Si atoms is 2000 wt ppm or less.

6. The copper alloy powder according to claim 4, wherein, when an LMM spectrum of Cu is analyzed based on XPS analysis in the copper alloy powder with the coating film containing Si atoms, a maximum peak intensity exists in a binding energy range of 569 to 571 eV.

7. The copper alloy powder according to claim 4, wherein an average particle diameter D50 (median diameter) in the copper alloy powder is 10 μm or more and 150 μm or less.

8. A method of producing the copper alloy powder according to claim 4, wherein a copper alloy powder is immersed in a solution containing a silane-based coupling agent, a coating film containing Si atoms is formed on the copper alloy powder, and the copper alloy powder is thereafter heated at a temperature of 1000° C. or less.

9. The copper alloy powder according to claim 3, wherein an oxygen concentration in the copper alloy powder with the coating film containing Si atoms is 2000 wt ppm or less.

10. The copper alloy powder according to claim 3, wherein, when an LMM spectrum of Cu is analyzed based on XPS analysis in the copper alloy powder with the coating film containing Si atoms, a maximum peak intensity exists in a binding energy range of 569 to 571 eV.

11. The copper alloy powder according to claim 3, wherein an average particle diameter D50 (median diameter) in the copper alloy powder is 10 μm or more and 150 μm or less.

12. A method of producing the copper alloy powder according to claim 3, wherein a copper alloy powder is immersed in a solution containing a silane-based coupling agent, a coating film containing Si atoms is formed on the copper alloy powder, and the copper alloy powder is thereafter heated at a temperature of 1000° C. or less.

13. The copper alloy powder according to claim 2, wherein an oxygen concentration in the copper alloy powder with the coating film containing Si atoms is 2000 wt ppm or less.

14. The copper alloy powder according to claim 2, wherein, when an LMM spectrum of Cu is analyzed based on XPS analysis in the copper alloy powder with the coating film containing Si atoms, a maximum peak intensity exists in a binding energy range of 569 to 571 eV.

15. The copper alloy powder according to claim 2, wherein an average particle diameter D50 (median diameter) in the copper alloy powder is 10 μm or more and 150 μm or less.

16. A method of producing the copper alloy powder according to claim 2, wherein a copper alloy powder is immersed in a solution containing a silane-based coupling agent, a coating film containing Si atoms is formed on the copper alloy powder, and the copper alloy powder is thereafter heated at a temperature of 1000° C. or less.

17. The copper alloy powder according to claim 1, wherein an oxygen concentration in the copper alloy powder with the coating film containing Si atoms is 2000 wt ppm or less.

18. The copper alloy powder according to claim 1, wherein, when an LMM spectrum of Cu is analyzed based on XPS analysis in the copper alloy powder with the coating film containing Si atoms, a maximum peak intensity exists in a binding energy range of 569 to 571 eV.

19. The copper alloy powder according to claim 1, wherein an average particle diameter D50 (median diameter) in the copper alloy powder is 10 μm or more and 150 μm or less.

20. A method of producing the copper alloy powder according to claim 1, wherein a copper alloy powder is immersed in a solution containing a silane-based coupling agent, a coating film containing Si atoms is formed on the copper alloy powder, and the copper alloy powder is thereafter heated at a temperature of 1000° C. or less.

* * * * *